US012723861B2

(12) United States Patent
Ha et al.

(10) Patent No.: US 12,723,861 B2
(45) Date of Patent: Sep. 1, 2026

(54) APPARATUS AND METHOD FOR MEASURING DEPTH OF THREE-DIMENSIONAL OBJECT

(71) Applicants: SAMSUNG DISPLAY CO., LTD., Yongin-si (KR); Pusan National University Industry-University Cooperation Foundation, Busan (KR)

(72) Inventors: Young Sang Ha, Yongin-si (KR); Ju Hyeong Lee, Busan (KR); Sung Jun Joo, Busan (KR); Beom Shik Kim, Yongin-si (KR); Young Chan Kim, Yongin-si (KR)

(73) Assignees: SAMSUNG DISPLAY CO., LTD., Yongin-si (KR); Pusan National University Industry-University Cooperation Foundation, Busan (KR)

(*) Notice: Subject to any disclaimer, the term of this patent is extended or adjusted under 35 U.S.C. 154(b) by 537 days.

(21) Appl. No.: 18/191,384

(22) Filed: Mar. 28, 2023

(65) Prior Publication Data

US 2023/0408246 A1 Dec. 21, 2023

(30) Foreign Application Priority Data

Jun. 15, 2022 (KR) ........................ 10-2022-0072580

(51) Int. Cl.
*G01B 7/26* (2006.01)
*G01S 17/08* (2006.01)
*H04N 13/275* (2018.01)

(52) U.S. Cl.
CPC ................ *G01B 7/26* (2013.01); *G01S 17/08* (2013.01); *H04N 13/275* (2018.05); *G06T 2207/10028* (2013.01)

(58) Field of Classification Search
None
See application file for complete search history.

(56) References Cited

U.S. PATENT DOCUMENTS 9,538,166 B2 1/2017 Yu et al.
10,610,775 B1 * 4/2020 Ebert ...................... G06F 3/013
12,477,050 B2 11/2025 Han et al.
(Continued)

FOREIGN PATENT DOCUMENTS

KR 10-2010-0104328 9/2010
KR 10-2013-0068851 A 6/2013
(Continued)

OTHER PUBLICATIONS

Office Action issued in corresponding Korean Patent Application No. 10-2022-0072580 on Jun. 17, 2026.

*Primary Examiner* — Talha M Nawaz
(74) *Attorney, Agent, or Firm* — F. CHAU & ASSOCIATES, LLC

(57) ABSTRACT

An apparatus for measuring a depth of a three-dimensional (3D) object includes a control unit generating the 3D object by adjusting parameters of a 3D pattern. A 3D display unit displays the 3D object with a preset depth. An input unit generates an input signal based on an input received from a user. A rail extends in a front and a rear of the 3D display unit. A moving body is movable on the rail. Movement of the moving body is adjusted based on the input signal. A distance sensor measures a distance to the moving body.

18 Claims, 21 Drawing Sheets

(56) References Cited

U.S. PATENT DOCUMENTS

2012/0026166 A1* 2/2012 Takeda .................. A63F 13/211
345/419
2014/0078045 A1* 3/2014 Yang ...................... H04N 13/31
345/156
2014/0375681 A1* 12/2014 Robbins ............... G01B 11/272
345/633
2015/0208057 A1* 7/2015 Wu ...................... H04N 13/254
348/49
2018/0041746 A1* 2/2018 Lin ........................... G06T 7/80
2019/0156552 A1* 5/2019 Han .......................... G06T 5/70
2022/0079694 A1* 3/2022 Freiin Von Kapri .... B25J 13/06
2023/0129945 A1* 4/2023 Pedoeem ........... A47B 21/0073
108/50.02
2023/0408246 A1* 12/2023 Ha ....................... H04N 13/275
2025/0252603 A1* 8/2025 Schick .................... G06T 7/593

FOREIGN PATENT DOCUMENTS

KR 10-2018-0048082 A 5/2018
KR 10-2020-0117427 A 10/2020

* cited by examiner

APPARATUS AND METHOD FOR MEASURING DEPTH OF THREE-DIMENSIONAL OBJECT

CROSS-REFERENCE TO RELATED APPLICATION

This application claims priority under 35 U.S.C. § 119 to Korean Patent Application No. 10-2022-0072580, filed on Jun. 15, 2022 in the Korean Intellectual Property Office, the disclosure of which is incorporated by reference in its entirety herein.

TECHNICAL FIELD

The present disclosure relates to an apparatus and method for measuring a depth for a three-dimensional object.

DISCUSSION OF RELATED ART

Methods of realizing a three-dimensional (3D) image include a glasses method in which a user utilizes glasses to view a 3D image and a glasses-free method in which a user does not utilize glasses to view the 3D image. Examples of the glasses method include a polarization glasses method and a shutter glasses method. Examples of the glasses-free method include a lenticular method and a parallax harrier method. These methods allow a user to view a 3D image using the binocular parallax of both eyes. The method of realizing a 3D image for the purpose of delivering the 3D image to a viewer should deliver a realistic 3D experience that is indistinguishable from the 3D experience encountered in a natural environment to the viewer.

A 3D object encountered in a real natural 3D environment is perceived as having the same 3D depth and 3D shape regardless of the observation distance, observation point, or observation environment. On the other hand, a 3D object perceived through a 3D display device has a 3D depth and a 3D shape perceived by being systematically distorted according to the observation distance, observation point, and observation environment.

SUMMARY

Aspects of the present disclosure provide a measuring apparatus and method for objectively quantifying and measuring perceptual distortion of a three-dimensional (3D) depth and shape induced by a current 3D display device to implement a 3D realistic image that induces the same sense of perception as that obtained from an object encountered in a natural 3D environment.

However, aspects of embodiments of the present disclosure are not restricted to those set forth herein. The above and other aspects of embodiments the present disclosure will become more apparent to one of ordinary skill in the art to which the present disclosure pertains by referencing the detailed description of embodiments of the present disclosure given below.

According to an embodiment of the present disclosure, an apparatus for measuring a depth of a three-dimensional (3D) object includes a control unit generating the 3D object by adjusting parameters of a 3D pattern, A 3D display unit displays the 3D object with a preset depth. An input unit generates an input signal based on an input received from a user. A rail extends in a front and a rear of the 3D display unit. A moving body is movable on the rail. Movement of the moving body is adjusted based on the input signal. A distance sensor measures a distance to the moving body.

According to an embodiment of the present disclosure, an apparatus for measuring a depth of a three-dimensional (3D) object includes a control unit generating the 3D object by adjusting parameters of a 3D pattern. A 3D display unit displays the 3D object with a preset depth. An input unit generates an input signal based on an input received from a user. A rail extends in a front and a rear of the 3D display unit. A moving body is movable on the rail. The movement of the moving body is adjusted based on the input signal. A distance sensor measures a distance to the moving body. The moving body is positioned at a position corresponding to a depth of the 3D object perceived by the user based on the input signal.

According to an embodiment of the present disclosure, a method for measuring a depth of a three-dimensional (3D) object includes generating the 3D object by adjusting parameters of a 3D pattern by a control unit. The generated 3D object is displayed by a display unit. A moving body is moved from a first end of a rail towards the display unit. An input signal is generated based on an input received from a user by an input unit. Movement of the moving body is stopped based on the input signal. A distance from a distance sensor to the moving body is measured when the movement of the moving body is stopped by a distance measuring unit.

The display device according to embodiments of the present disclosure may measure a degree of depth perception distortion and a degree of shape perception distortion of a 3D image.

However, the effects of embodiments of the present disclosure are not restricted to the one set forth herein, and various other effects are included in the present specification.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF EMBODIMENTS

Figure 1:
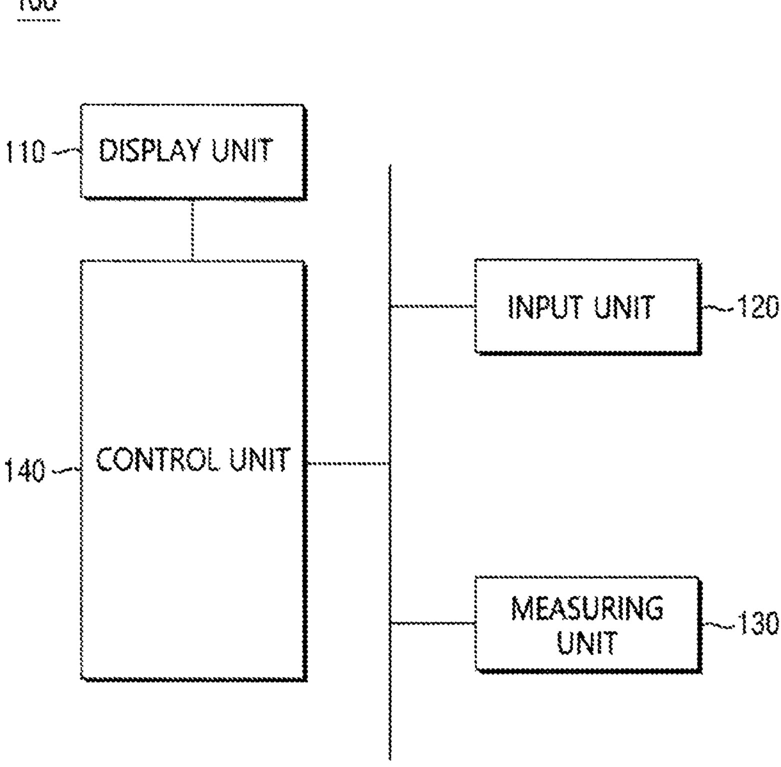
FIG. 1 is a block diagram illustrating a schematic apparatus for measuring a depth of a three-dimensional (3D) display device for measuring perceptual distortion of a 3D object according to an embodiment of the present disclosure.

Embodiments of the present disclosure will now be described more fully hereinafter with reference to the accompanying drawings. Embodiments may, however, be provided in different forms and should not be construed as limiting. The same reference numbers indicate the same components throughout the disclosure. In the accompanying figures, the thickness of layers and regions may be exaggerated for clarity.

Some of the parts which are not associated with the description may not be provided in describing embodiments of the disclosure.

It will also be understood that when a layer is referred to as being "on" another layer or substrate, it can be directly on the other layer or substrate, or intervening layers may also be present. In contrast, when an element is referred to as being "directly on" another element, there may be no intervening elements present.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning such as "apart from" or "set aside from" or "offset from" and any other suitable equivalents as would be appreciated and understood by those of ordinary skill in the art. The terms "face" and "facing" may mean that a first object may directly or indirectly oppose a second object. In an embodiment in which a third object intervenes between a first and second object, the first and second objects may be understood as being indirectly opposed to one another, although still facing each other.

The spatially relative terms "below," "beneath," "lower," "above," "upper," or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in an embodiment in which a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

When an element is referred to as being "connected" or "coupled" to another element, the element may be "directly connected" or "directly coupled" to another element, or "electrically connected" or "electrically coupled" to another element with one or more intervening elements interposed therebetween. It will be further understood that when the terms "comprises," "comprising," "has," "have," "having," "includes" an for "including" are used, they may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

The terms "about" or "approximately" as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, "about" may mean within one or more standard deviations, or within ±30%, 20%, 10%, 5% of the stated value.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

FIG. 1 is a block diagram schematically illustrating a configuration of an apparatus for measuring a depth of a three-dimensional (3D) display device according to an embodiment.

Referring to FIG. 1, an apparatus 100 for measuring a depth of a schematic 3D display device for measuring perceptual distortion of a 3D object may include a 3D display unit 110, an input unit 120, a measuring unit 130, and a control unit 140, In an embodiment, the apparatus 100 for measuring a depth of a schematic 3D display device may further include a memory.

The 3D display unit 110 may display a 3D image. For example, the 3D display unit 110 may display various depth stimuli by adjusting parameters of a 3D pattern according to an instruction of the control unit 140. In an embodiment, the parameters may include any one or more of size or spatial frequency.

The input unit 120 receives an input operation (e.g., an input) of a user, converts the user's input operation into an input signal and transmits the input signal to the control unit 140. In an embodiment, the input unit 120 may be implemented as, for example, a keyboard, a mouse, a touch sensor on a touch screen, a touch pad, a keypad, a voice input, and any other input processing device(s). The input unit 120 may receive, for example, a signal for measuring a perceived distance of a user and transmit the signal to the measuring unit 130 or the control unit 140.

The measuring unit 130 measures a perceptible depth of the user. A configuration of the measuring unit 130 will be described in detail with reference to FIGS. 3 to 5 to be described later.

The control unit 140 controls the overall operation and each component of the apparatus 100 for measuring a depth of the 3D display device. For example, the control unit 140 generates a 3D object displayed on the display unit 110 as will be described later. The control unit 140 generates the 3D object by adjusting the parameters of the pattern. In an embodiment, the parameters include a size and/or a spatial frequency of a pattern. In addition, the control unit 140 may adjust a depth of the generated 3D object. The control unit 140 may determine a maximum perceptible depth and resolution based on a measurement value of the measuring unit 130. This will be described in detail with reference to FIG. 20 to be described later.

In an embodiment, the operations performed by the control unit 140 may be distributed and processed by several physically separated arithmetic and logic units. For example, in an embodiment some of the operations performed by the control unit 140 may be performed by a first server, and other operations may be performed by a second server. In this embodiment, the control unit 140 may be implemented as a sum of physically separated arithmetic and logic units.

The input unit 120, the measuring unit 130, and the control unit 140 according to an embodiment of the present disclosure may be implemented through a nonvolatile memory configured to store an algorithm configured to control operations of various components of the apparatus for displaying the depth of the 3D display device or data about software instructions reproducing the algorithm and a processor configured to perform operations to be described below using the data stored in the non-volatile memory. In an embodiment, the memory and the processor may be implemented as distinct chips. Alternatively, the memory and processor may be implemented as a single chip integrated with each other. The processor may have the form of one or more processors.

Figure 2:
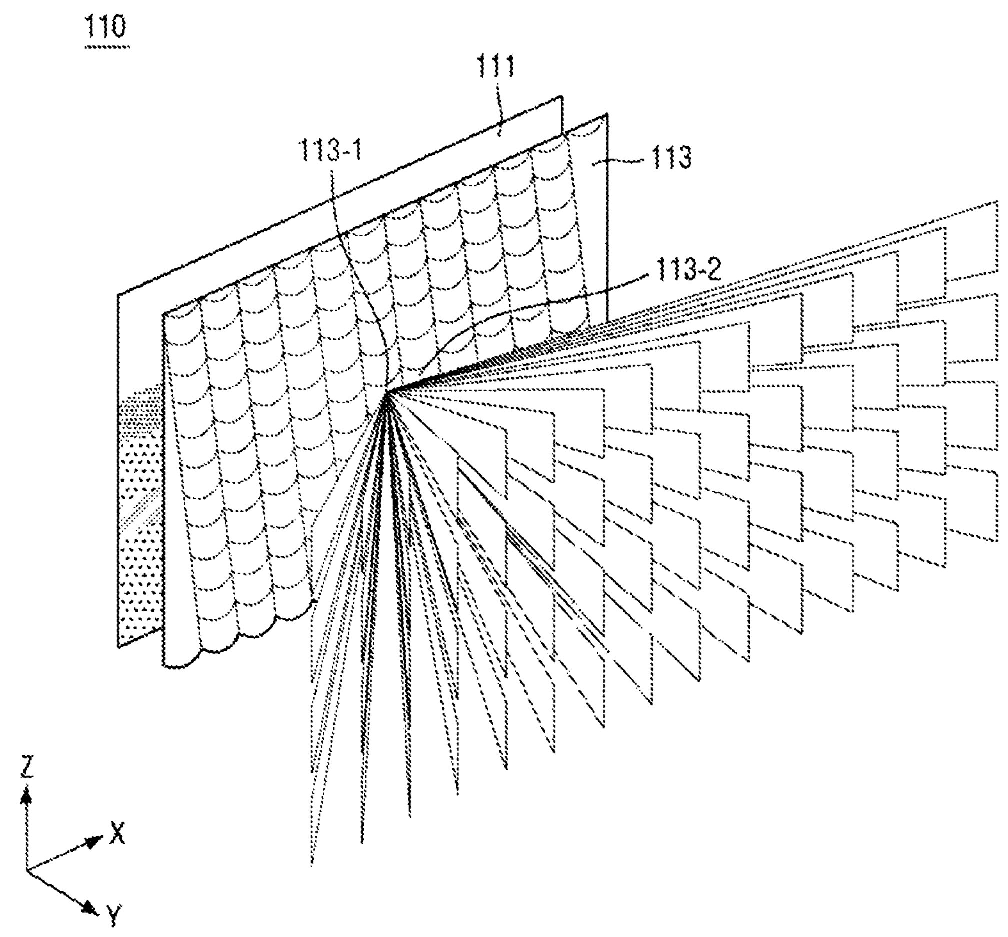
FIG. 2 is a perspective view illustrating a schematic configuration of a display unit for displaying a three-dimensional image according to an embodiment of the present disclosure.

FIG. 2 is a perspective view illustrating a schematic configuration of a display unit for displaying a three-dimensional image according to an embodiment.

The 3D display unit 110 may include a display panel 111 displaying an image and an optical layer 113 through which light emitted (e.g., output) from the display panel 111 passes.

In an embodiment, in the 3D display unit 110, a first direction (e.g., an x direction) is a width, and a third direction perpendicular to the first direction is a length. A front surface of the 3D display unit 110 is disposed toward a second direction (e.g., a y direction). Image display light of the 3D display unit 110 is emitted in the second direction. However, embodiments of the present disclosure are not necessarily limited thereto.

The 3D display unit 110 may display an object with a positive depth that makes the object appear to the user to protrude in a front direction based on a position of the 3D display unit 110. In addition, the 3D display unit 110 may display the object with a negative depth that makes the object appear to the user to be retracted from the 3D display unit 110.

In an embodiment, the display panel 111 may include various flat display panels. For example, in an embodiment one of a plasma display panel, an organic light emitting display panel, an electrophoretic display panel, a liquid crystal display panel, and an electrowetting display panel may be used. However, embodiments of the present disclosure are not necessarily limited thereto.

The display panel 111 may include a plurality of pixels, which are minimum units for displaying an image. The display panel 111 includes a plurality of pixel areas in which the plurality of pixels are respectively disposed.

Each of the pixels includes sub-pixels, and a structure of the sub-pixels may be variously modified. In an embodiment, the sub-pixels may include, for example, an R (Red) pixel, a G (Green) pixel, and a B (Blue) pixel. For example, in an embodiment the display panel 111 may be an RGB panel in which the sub-pixels are arranged in a stripe pattern, or a pentile panel in which the sub-pixels are arranged in a diamond pattern. However, embodiments of the present disclosure are not necessarily limited thereto and the colors and arrangement of the sub-pixels may vary. For example, the display panel 111 may implement light rays in different directions based on the pentile panel. A general RGB panel may have a sub-pixel structure in which one pixel includes an R sub-pixel, a G sub-pixel, and a B sub-pixel having the same size. However, embodiments of the present disclosure are not necessarily limited thereto. For example, the R sub-pixel, the G sub-pixel, and the B sub-pixel included in the pentile panel may have different sizes. In one pixel, the G sub-pixel and the R sub-pixel may be disposed in a diagonal direction. In addition, in one pixel, the G sub-pixel and the B sub-pixel may be disposed in the diagonal direction. However, embodiments of the present disclosure are note necessarily limited thereto and the arrangement of sub-pixels in one pixel may be variously modified. In addition, the size and shape of each of the R sub-pixel, the G sub-pixel, and the B sub-pixel may be variously The optical layer 113 may be disposed in a light output direction of the display panel 111. For example, the optical layer 113 is disposed in a light output direction of the plurality of pixels. The optical layer 113 may include a plurality of lenses respectively corresponding to the plurality of pixels. However, embodiments of the optical layer 113 are not necessarily limited thereto. For example, in an embodiment the optical layer 113 may be a parallax barrier having a vertical slit arrangement.

A direction of a light ray output from the pixel (or sub-pixel) included in the display panel 111 may be determined through the optical layer 113. Light output from each of the sub-pixels may be emitted (e.g., output) as a light ray in a specific direction while passing through the optical layer 113. Through such a process, the 3D display unit 110 may display a stereoscopic image or a multi-view image. Optical characteristics of the 3D display unit 110 may include characteristics related to the direction of light rays of sub-pixels included in the display panel 111.

In an embodiment as shown in FIG. 2, the optical layer 113 may include a plurality of optical elements 113-1 and 113-2. Each of the optical elements may be referred to as a '3D pixel'. One 3D pixel can output light rays including different information in multiple directions. For example, in an embodiment light rays in a 15×4 direction may be output from one 3D pixel included in the optical layer 113. However, embodiments of the present disclosure are not necessarily limited thereto. The 3D display unit 110 may generate an image at different points in a 3D space using the plurality of 3D pixels.

Figure 3:
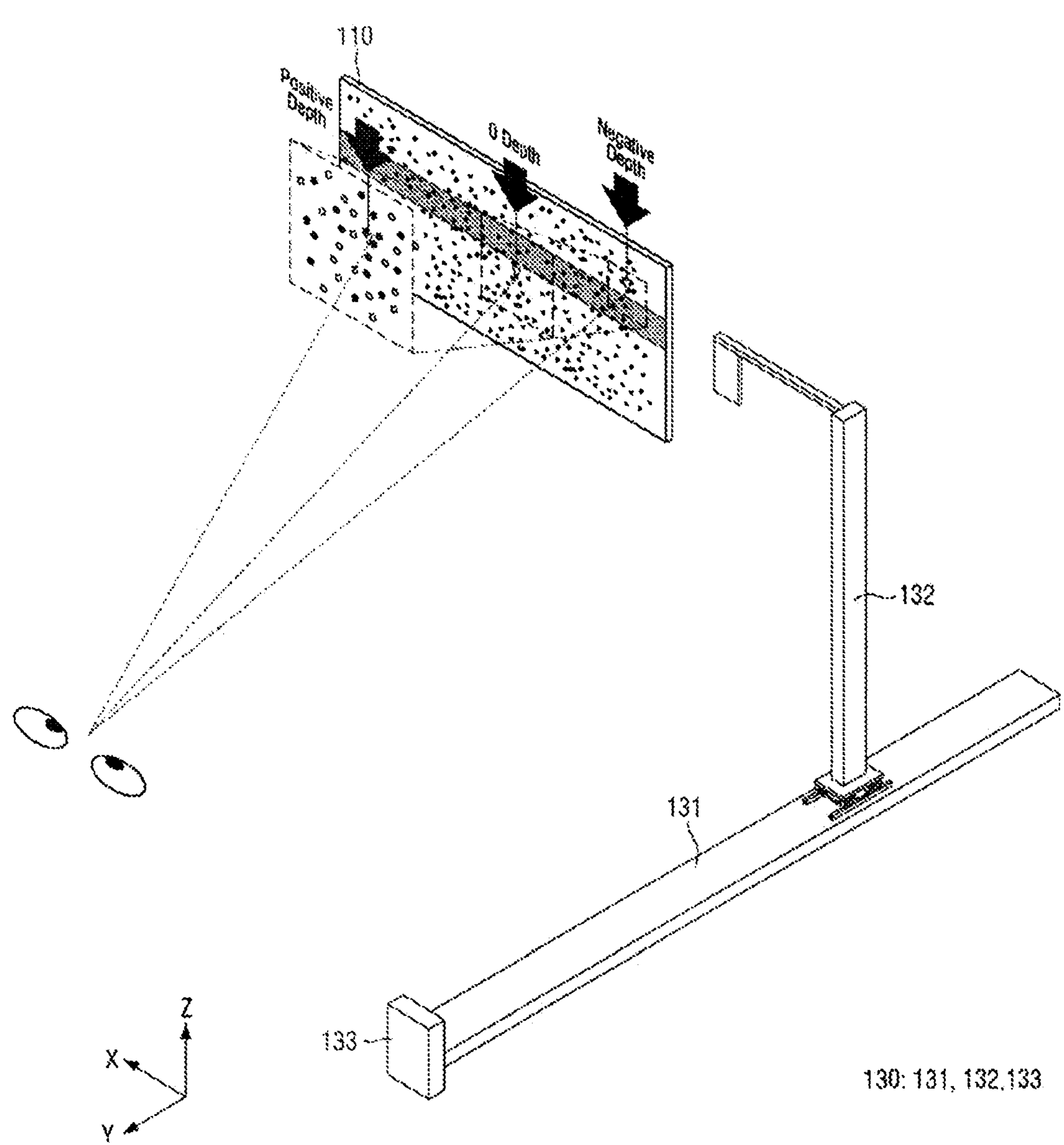
FIG. 3 is a perspective view schematically illustrating a structure of an apparatus for measuring a depth of a 3D display device according to an embodiment of the present disclosure.

FIG. 3 is a perspective view schematically illustrating a structure of an apparatus for measuring a depth of a 3D display device according to an embodiment.

Referring to FIG. 3, the measuring unit 130 may include a rail 131, a moving body 132, and a distance sensor 133. In addition, in an embodiment the measuring unit 130 may further include a communication unit.

In an embodiment, the rail 131 is positioned adjacent to the 3D display unit 110 and extends in the second direction (e.g., the y direction). Although it is illustrated in the embodiment shown in FIG. 3 that the rail 131 is disposed on a side surface of the 3D display unit 110, embodiments of the present disclosure is not necessarily limited thereto.

The rail 131 is provided as a guide to allow the moving body 132 to move by sliding on the rail 131.

In an embodiment, the moving body 132 moves forward in a direction in which the image display light of the 3D display unit 110 is emitted or moves backward in a direction opposite to the light emission direction of the image display light along the rail 131.

In an embodiment, the moving body 132 may stop its movement (e.g., become stationary) according to an input signal. In an embodiment, the moving body 132 may also change its moving direction and/or its moving speed according to the input signal.

In an embodiment, the distance sensor 133 is disposed on one end of the rail 131 (e.g., a first end). The distance sensor 133 may be a component for measuring a distance d between the moving body 132 and the one end of the rail 131 that the distance sensor 133 is disposed. In an embodiment, the distance sensor 133 may be any one of an infrared distance sensor, an ultrasonic sensor, and a laser distance sensor.

In an embodiment, the distance sensor 133 includes a transmitting unit and a receiving unit. In an embodiment, the transmitting unit emits infrared rays, ultrasonic pulses, or lasers and the receiving unit receives a reflected signal that collides with an object and is returned so that a distance is calculated based on a time difference therebetween. However, embodiments of the present disclosure are not necessarily limited thereto.

In an embodiment, the distance sensor 133 disposed at the one end of the rail 131 calculates the distance by transmitting infrared rays or lasers toward the moving body 132, and measuring the time it takes for the transmitted infrared rays or lasers to be reflected by the moving body 132 and returned.

However, embodiments of the present disclosure are not necessarily limited thereto. For example, in an embodiment, the distance sensor 133 may be attached to the moving body 132. In an embodiment in which the distance sensor 133 is attached to the moving body 132, the distance sensor 133 calculates the distance by transmitting infrared rays or lasers toward one end of the rail 131 and measuring the time it takes for the transmitted infrared rays or lasers to be reflected and returned.

In an embodiment, the moving body 132 may stop its movement according to the input signal, and a distance from the stopped position to one end of the rail 131 may be measured, The communication unit may receive an input signal input by the user directly from the input unit 120 or from the input unit 120 through the control unit 140. In an embodiment, the input unit (120 in FIG. 1) may generate an input signal according to a user's input and transmit the input signal to the measuring unit 130 or the control unit 140.

Figure 4:
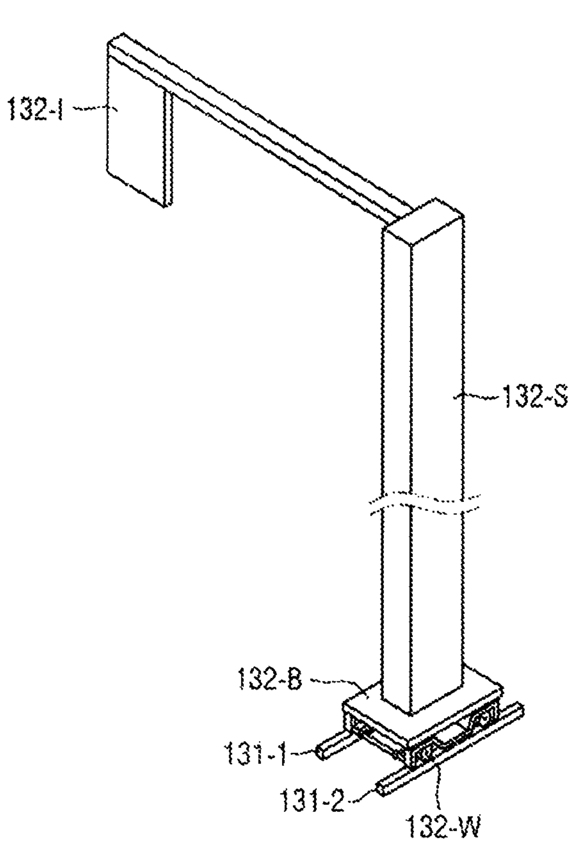
FIG. 4 is a perspective view schematically illustrating a structure of a measuring unit according to an embodiment of the present disclosure.
Figure 5:
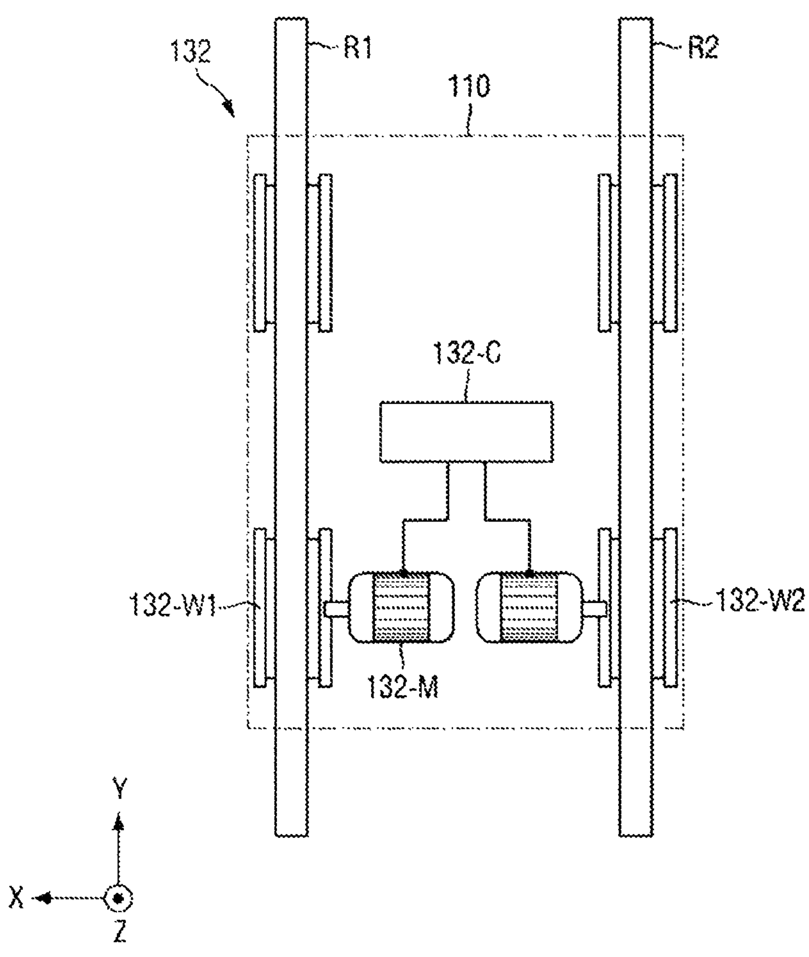
FIG. 5 is a plan view illustrating the structure of the measuring unit according to an embodiment of the present disclosure.

FIG. 4 is a perspective view schematically illustrating a structure of a measuring unit 130 according to an embodiment, and FIG. 5 is a plan view illustrating the structure of the measuring unit 130 according to an embodiment.

As illustrated in FIGS. 4 and 5, in an embodiment the moving body 132 may include a traveling body 132-B, a wheel 132-W, a driving unit 132-M, a controller 132-C, an indicator 132-I, and a support portion 132-S.

The traveling body 132-B that constitutes an overall main body of the moving body 132 may be implemented in various structures, and in an embodiment, a structure thereof is briefly illustrated for convenience of description.

In an embodiment, the center of gravity of the moving body 132 may be positioned in the traveling body 132-B. Accordingly, the moving body 132 does not overturn while the moving body 132 moves.

In an embodiment a plurality of wheels 132-W may be disposed at a lower end of the traveling body 132-B, and may travel along a pair of rails R1 and R2 by receiving rotational driving force by at least one driving unit 132-M, which will be described later. Although a general example in which all four wheels 132-W are provided in a pair at the front and rear of the traveling body 132-B, respectively, is illustrated in an embodiment of FIG. 5, the number and arrangement position of the wheels 132-W are not necessarily limited thereto and may be freely changed by those skilled in the art.

The driving unit 132-M may be connected to at least one of the plurality of wheels 132-W, and may provide rotational driving force to drive the plurality of wheels 132-W. Although FIG. 5 illustrates an example in which two driving units 132-M are connected to a pair of wheels 132-W1 and 132-W2 disposed at the rear of the traveling body 132-B, the number and connection positions of the driving units 132-M are not necessarily limited thereto and may be changed freely by those skilled in the art.

The controller 132-C may be connected to the driving unit 132-M, and may control the driving of the driving unit 132-M based on a signal input through a communication unit. For example, in an embodiment the controller 132-C may stop the movement of the moving body 132 by controlling the driving of the driving unit 132-M. In an embodiment, the controller 132-C may also change the moving direction and/or the moving speed of the moving body 132 by controlling the driving of the driving unit 132-M.

In an embodiment, the support portion 132-S extends from the traveling body 132-B in the third direction (e.g., the z direction).

In an embodiment, the indicator 132-I extends from the support portion 132-S in the first direction (e.g., the x direction). The indicator 132-I is positioned to be spaced apart from the display unit 110. In an embodiment, the indicator 132-I is disposed on a straight line (e.g., in the x direction) with a virtual 3D object perceived by the subject (e.g., the user) at a point of time when the input signal generated by the input unit 120 is received.

The display unit 110 and the indicator 132-I are positioned to be spaced apart from each other in a manner so that even when the moving body 132 moves forward or backward on the rail 131, the display unit 110 and the indicator 132-I do not collide with each other.

Figure 6:
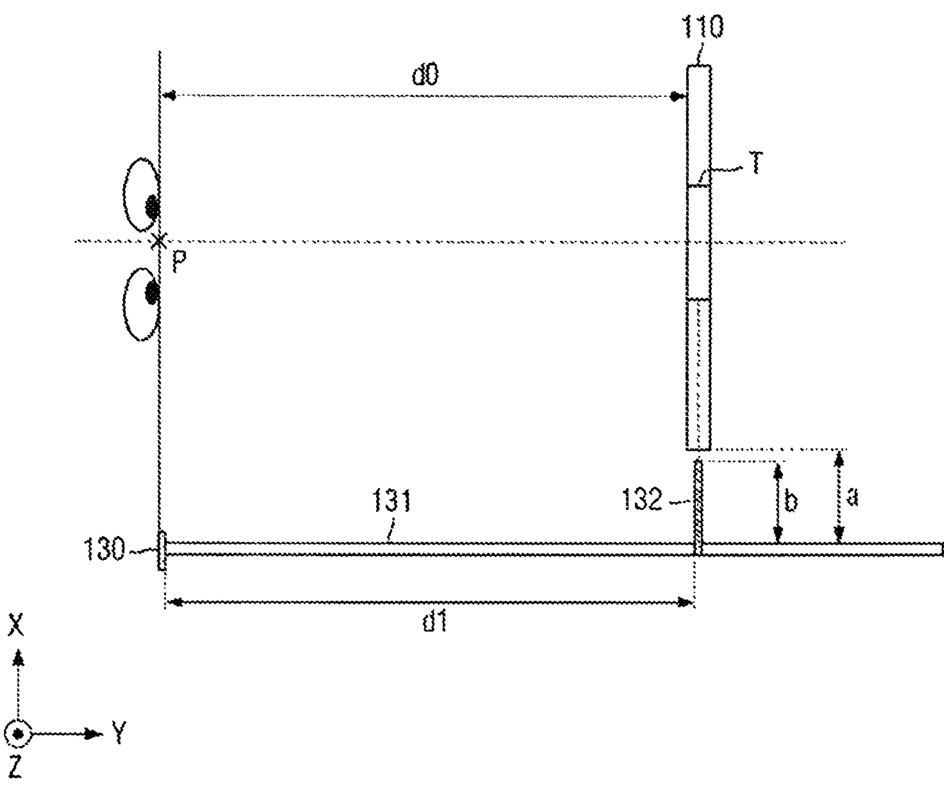
FIG. 6 is a schematic plan view of the apparatus for measuring a depth of a 3D display device for describing a reference distance according to an embodiment of the present disclosure.
Figure 7:
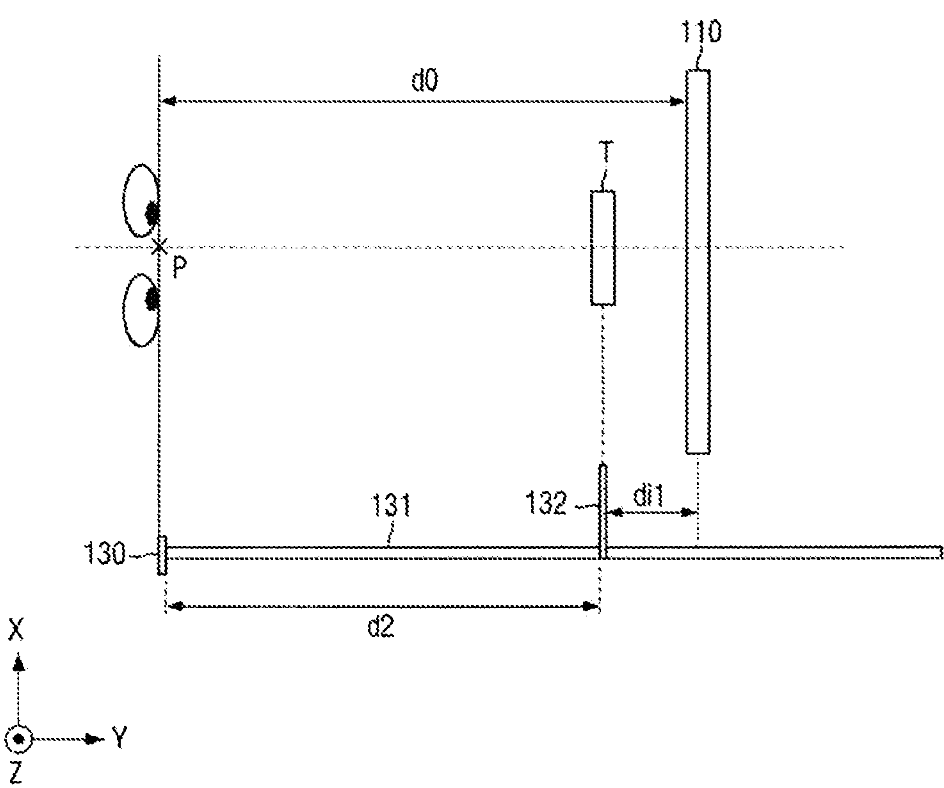
FIG. 7 is a schematic plan view of the apparatus for measuring a depth of a 3D display device for measuring a positive depth according to an embodiment of the present disclosure.
Figure 8:
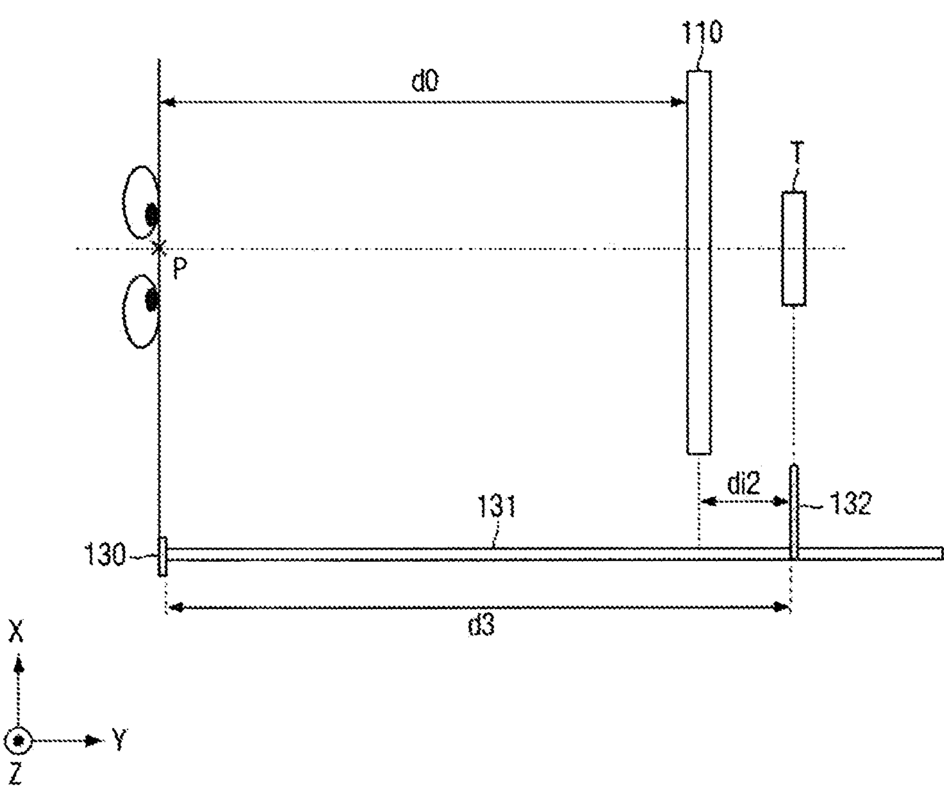
FIG. 8 is a schematic plan view of the apparatus for measuring a depth of a 3D display device for measuring a negative depth according to an embodiment of the present disclosure.

FIG. 6 is a schematic plan view of the apparatus for measuring a depth of a 3D display device for describing a reference distance according to an embodiment, FIG. 7 is a schematic plan view of the apparatus for measuring a depth of a 3D display device for measuring a positive depth according to an embodiment, and FIG. 8 is a schematic plan view of the apparatus for measuring a depth of a 3D display device for measuring a negative depth.

Referring to FIG. 6, in an embodiment the user P is positioned on a straight line with one end of the rail 131.

A distance d0 between the user P (e.g., the subject) and the display unit 110 is a reference distance.

A distance d1 when the indicator 132-I is positioned on a straight line (e.g., in the x direction) with the 3D display unit 110 in the first direction (e.g., the x direction) is measured. At the distance d1, the indicator 132-I and the 3D display unit 110 are positioned at a same distance in the y direction to the user P. The measured value d1 at this time is the reference distance.

Referring to FIG. 7, the 3D display unit 110 displays a 3D object T having a positive depth.

The 3D object T having a positive depth is positioned so that a distance of the 3D object perceived by the user P to the user P is less than a distance from the user P to the 3D display unit 110 (e.g., the reference distance, such as measured value d1).

By receiving an input(s) from the user (e.g., manipulation of input unit 120 by the user), the input unit (120 in FIG. 1) generates an input signal so that the moving body 132 moves until the indicator 132-I is positioned on a straight line (e.g., in the x direction) with the 3D object in which the indicator 132-I is positioned at a same distance from the user P (e.g., in the y direction) as the distance of the 3D object perceived by the user. The moving body 132 stops the movement when the indicator 132-I is positioned on a straight line (e.g., in the x direction) with the 3D object T according to the input signal. The measuring unit 130 measures a distance at this time between the user and the moving body 132 to obtain a first measurement value d2. A difference di1 between the reference distance and the first measurement value d2 corresponds to a positive depth. As the difference dig between the reference distance and the first measurement value d2 increases, the user perceives the 3D object as further protruding forward.

Referring to FIG. 8, the 3D display unit 110 displays a 3D object T having a negative depth.

The 3D object T having a negative depth is positioned so that a distance of the 3D object T perceived by the user P to the user P is greater than a distance from the user P to the 3D display unit 110 (e.g., the reference distance, such as measured value d1).

By receiving an input(s) from the user P (e.g., manipulation of the input unit 120 by the user), the input unit (120 in FIG. 1) generates an input signal so that the moving body 132 moves until the indicator 132-I is positioned on a straight line with the 3D object T (e.g., in the x direction) in which the indicator 132-I is positioned at a same distance (e.g., in the y direction) from the user P as the distance of the 3D object T perceived by the user. The moving body 132 stops the movement when the indicator 132-I is positioned on a straight line (e.g., in the x direction) with the 3D object T according to the input signal. The measuring unit 130 measures a distance at this time to obtain a second measurement value d3. A difference di2 between the reference distance and the second measurement value d3 corresponds to a negative depth. As the difference di2 between the reference distance and the second measurement value d3 increases, the user P perceives the 3D object T as protruding further backwards.

Figure 9:
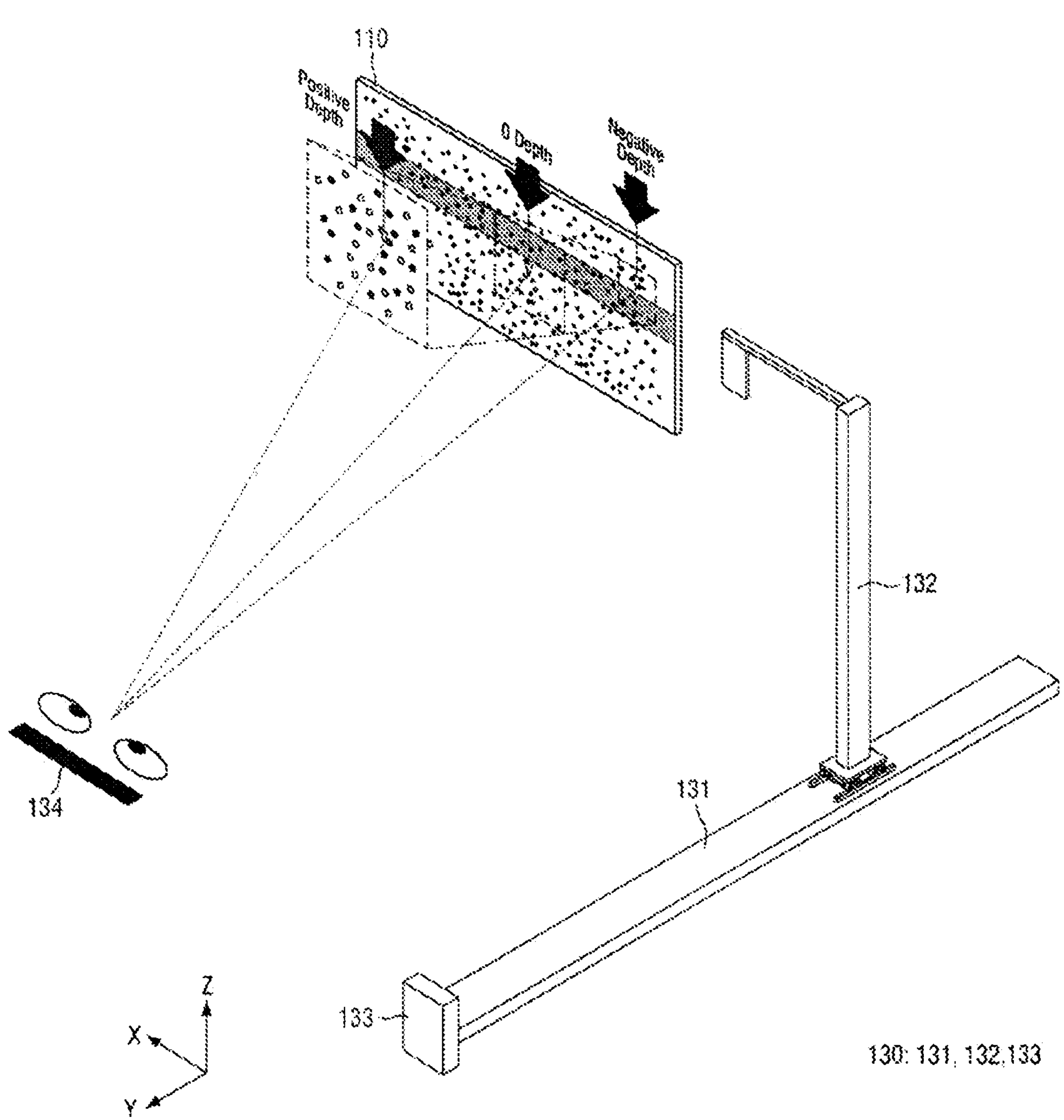
FIG. 9 is a perspective view schematically illustrating a structure of an apparatus for measuring a depth of a 3D display device according to an embodiment of the present disclosure.

FIG. 9 is a perspective view schematically illustrating a structure of an apparatus for measuring a depth of a 3D display device according to an embodiment.

Binocular parallax, which is related to depth distortion, is inversely proportional to a square of an observation distance. Therefore, an accuracy of the observation distance during measurement affects an accuracy of the measurement value.

Referring to FIG. 9, to fix the observation distance of the user (e.g., maintain a constant observation distance), a jig portion 134 may be disposed on the same line (e.g., in the x direction) with one end of the rail 131 in the second direction (e.g., the y direction). In an embodiment, the jig portion 134 may support a chin or forehead of the user and may have a shape that opens a field of view of the user so that the user may gaze at the front of the 3D display unit 110. However, embodiments of the present disclosure are not necessarily limited thereto.

An embodiment of FIG. 9 is substantially the same as or similar to the embodiment of FIGS. 1 to 8 except that the jig portion 134 is further disposed in the measuring unit 130, and an overlapping description will thus be omitted below for economy of description.

Figure 10:
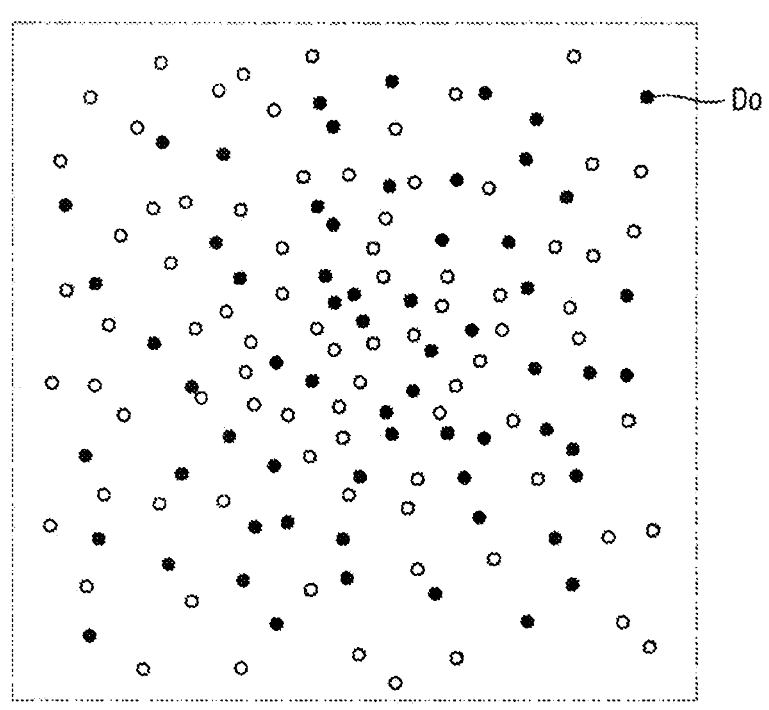
FIGS. 10 to 12 are examples of a 3D object displayed on a 3D display unit according to embodiments of the present disclosure.
Figure 11:
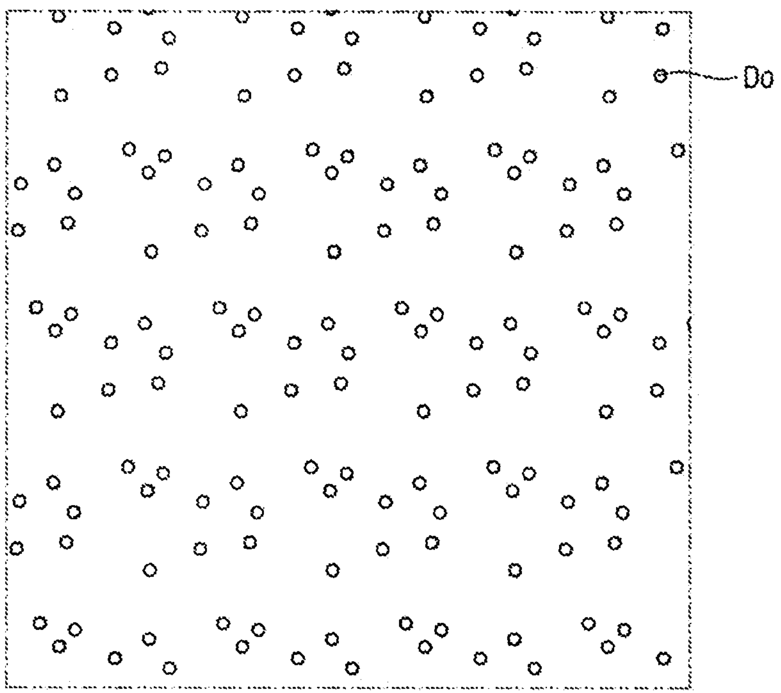
Figure 12:
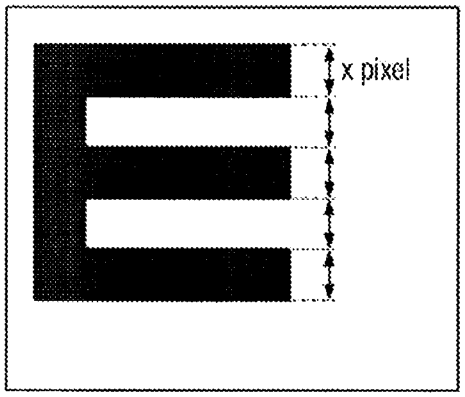

FIGS. 10 to 12 are examples of a 3D object displayed on a 3D display unit according to embodiments of the present disclosure.

As illustrated in FIG. 10, in an embodiment the 3D object may be a random dot pattern.

The random dot pattern may have a pattern of a plurality of randomly arranged dots Do. According to a depth in the random dot pattern, an interval between a plurality of randomly arranged dots Do may increase or decrease in proportion to the depth.

As illustrated in FIG. 11, in an embodiment the 3D object may be a pseudorandom dot pattern.

The pseudorandom dot pattern may have a pattern in which groups having a plurality of randomly arranged dots Do are regularly arranged. According to a depth in the pseudorandom dot pattern, an interval between a plurality of randomly arranged dots Do may increase or decrease in proportion to the depth.

As illustrated in FIG. 12, in an embodiment the 3D object may be a letter, for example, the letter "E". In an embodiment, an interval x between each horizontal stroke of the letter "E" has the same length.

Figure 13:
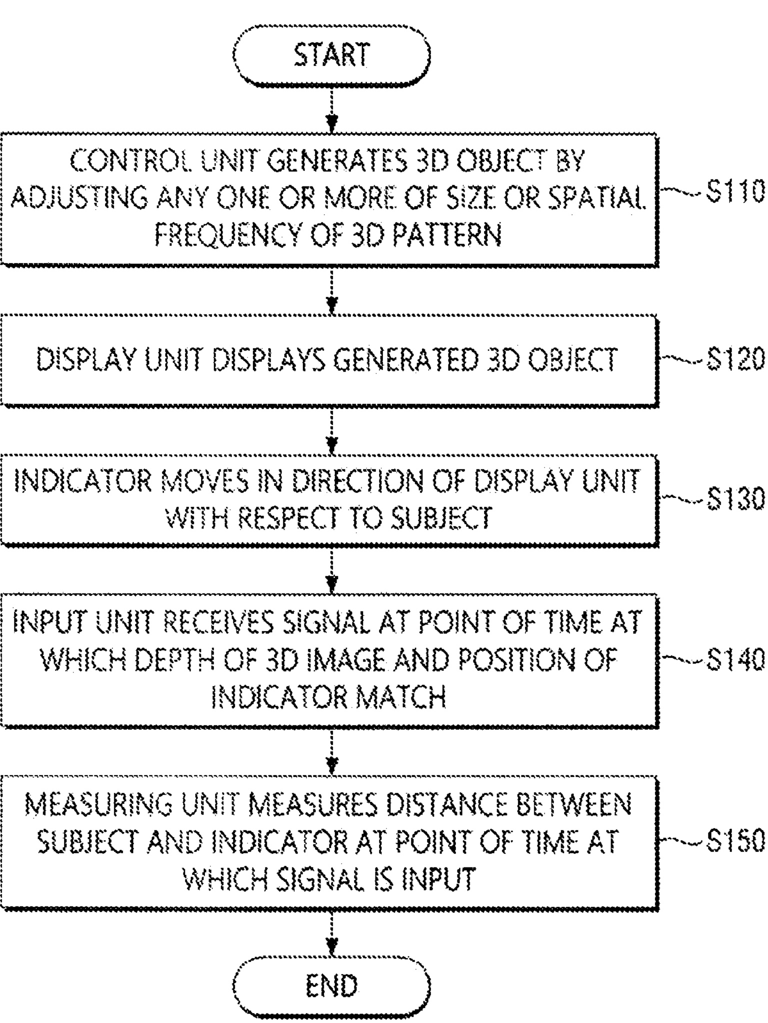
FIG. 13 is a flowchart illustrating a method for measuring 3D perceptual distortion according to an embodiment of the present disclosure.

FIG. 13 is a flowchart illustrating a method for measuring 3D perceptual distortion according to an embodiment. The method for measuring 3D perceptual distortion of FIG. 13 is performed by the apparatus for measuring 3D perceptual distortion described with reference to FIGS. 1 to 12.

In step S110, the control unit generates a 3D object to be displayed by adjusting any one or more of a size or a spatial frequency of a 3D pattern.

In step S120, the display unit displays the generated 3D object.

In step S130, the moving body moves from one end of the rail in a direction of the display unit.

In an embodiment, one end of the rail may be positioned on a straight line with the user (e.g., in the x direction). However, embodiments of the present disclosure are not necessarily limited thereto. For example, in an embodiment, the moving body may be configured to move to one end of the rail on a straight line with the display unit. In this embodiment, the driving unit of the moving body drives the wheels according to the instructions of the controller.

In step S140, the input unit generates an input signal according to a manipulation of the input unit 120 by the user (e.g., an input(s) received by the input unit 120 from the user). The position of the moving body at the time when the input signal is generated is positioned on a straight line with the 3D object (e.g., in the x direction) in which the 3D object is perceived by the user to be a same distance from the user (e.g., in the y direction) as a portion of the moving body, such as the indicator.

In step S150, a distance measuring unit receives the generated input signal and measures a distance from the distance sensor to the moving body. In an embodiment, the distance sensor may be disposed at one end of the rail. In this embodiment, the distance sensor measures a distance from one end of the rail to the moving body.

When the input signal is not generated for a preset time in step S140 from the user, the control unit may recognize the corresponding parameter as a depth measurement error. The depth measurement error may mean that the 3D object to which the corresponding parameter is applied is not normally recognized by the user. The preset time may be a time after the display of the 3D object.

Figure 14:
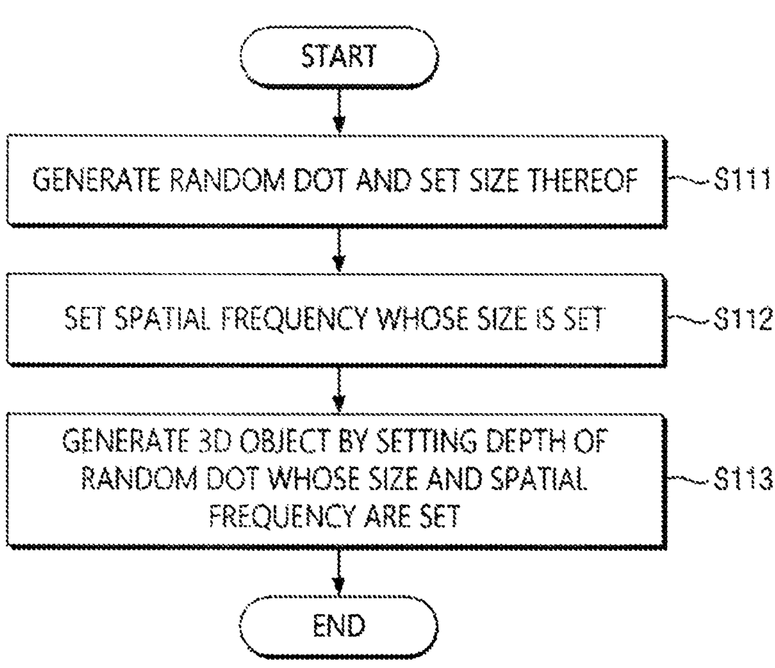
FIG. 14 is a flowchart illustrating step S110 in detail according to an embodiment of the present disclosure.
Figure 15:
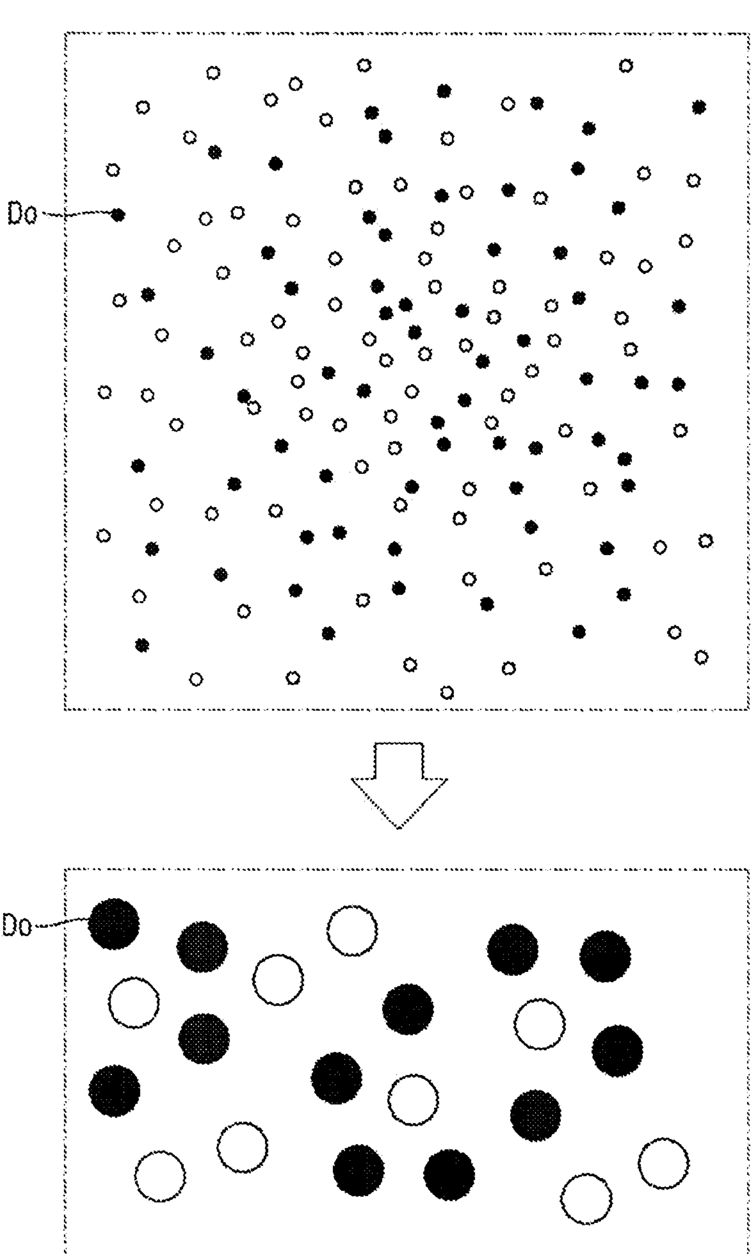
FIG. 15 is an illustrative view for describing adjustment of a size of a random dot according to an embodiment of the present disclosure.
Figure 16:
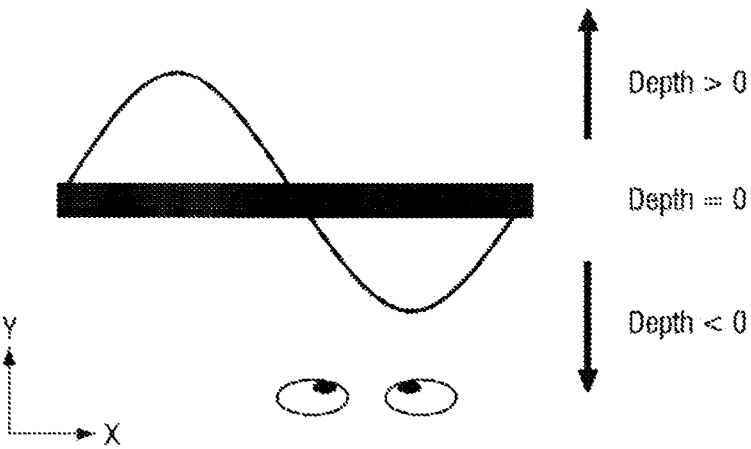
FIG. 16 is an illustrative view illustrating a spatial frequency according to an embodiment of the present disclosure.
Figure 17:
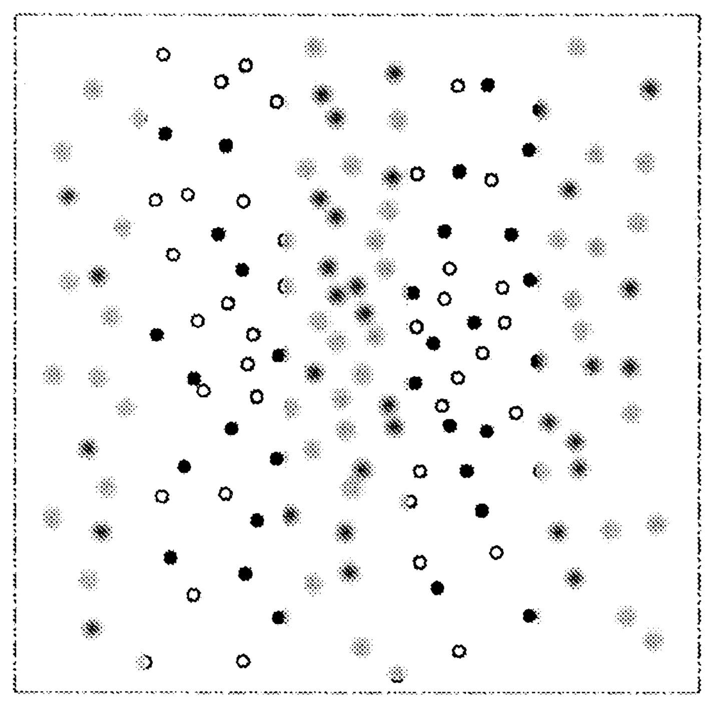
FIG. 17 is an illustrative view illustrating spatial frequency adjustment according to an embodiment of the present disclosure.

FIG. 14 is a flowchart illustrating step S110 in detail according to an embodiment, FIG. is an illustrative view for describing adjustment of a size of a random dot according to an embodiment, FIG. 16 is an illustrative view illustrating a spatial frequency, and FIG. 17 is an illustrative view illustrating adjustment of the spatial frequency.

Referring to FIGS. 14 to 17, in step S111, a random dot Do is generated and a size thereof is set. Although the random dot Do is generated in an embodiment, embodiments of the present disclosure are not necessarily limited thereto. For example, in an embodiment, the pseudorandom dot illustrated in FIG. 11 may be adopted or another image type may be generated for the 3D object. In an embodiment, in the setting of the size, the size may be reduced or enlarged according to a predefined size level, or may also be set by receiving a desired numerical value.

In step S112, a spatial frequency is set for the random dot having the determined size. Here, the spatial frequency has the meaning of a frequency at which an event periodically reoccurs (e.g., an image sequence is imaged). A degree of change in pixel brightness is plotted in the form of a waveform as illustrated in FIG. 16.

In step S113, a 3D object is generated by setting a depth of the random dot having a size and spatial frequency that are determined. A method of setting a depth includes, for example, a method of adjusting binocular parallax, but is not necessarily limited thereto. In the method of setting the depth by adjusting the parallax, when the parallax increases while a user's position is fixed, the depth increases.

In an embodiment, the size of the random dot Do is set in step S111 and the spatial frequency of the random dot Do is set in step S112. However, embodiments of the present disclosure are not necessarily limited thereto and any one of the steps may be omitted or the order thereof may be changed.

Figure 18:
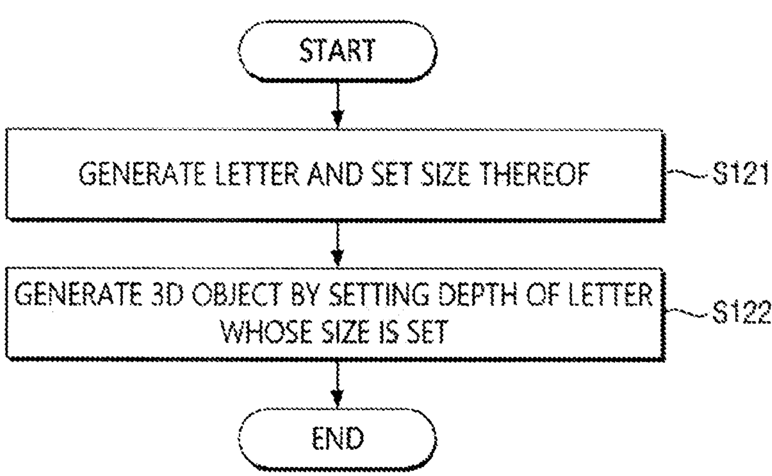
FIG. 18 is a flowchart illustrating step S110 in detail according to an embodiment of the present disclosure.
Figure 19:
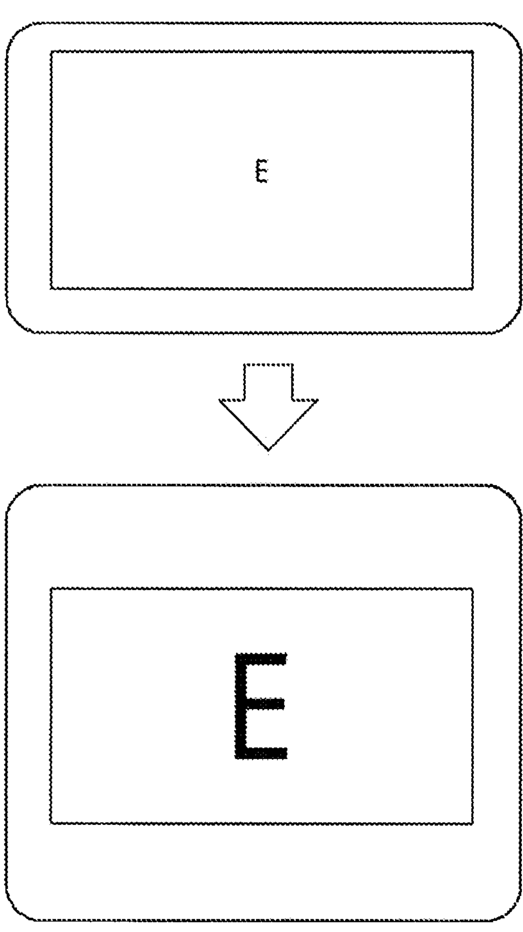
FIG. 19 is an illustrative view for describing adjustment of a size of a letter according to an embodiment of the present disclosure.

FIG. 18 is a flowchart illustrating step S110 in detail according to an embodiment, and FIG. 19 is an illustrative view for describing adjustment of a size of a letter according to an embodiment.

Referring to FIGS. 18 and 19, in step S121, a letter is generated and a size thereof is set. In an embodiment, in the setting of the size of the letter, the size may be reduced or enlarged according to a predefined size level, or may also be set by receiving a desired numerical value.

In step S122, a 3D object is generated by setting a depth of the letter having a size that is determined. In an embodiment, a method of setting a depth includes, for example, a method of adjusting binocular parallax, but is not necessarily limited thereto. In the method of setting the depth by adjusting the parallax, when the parallax increases while a user's position is fixed, the depth increases.

Figure 20:
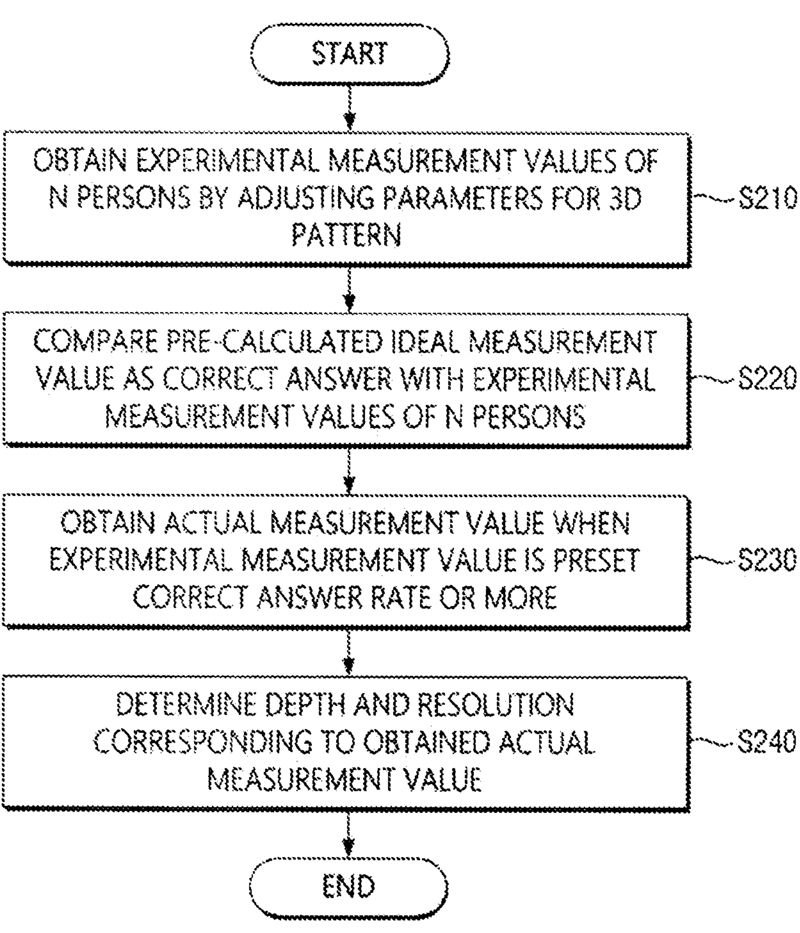
FIG. 20 is a flowchart illustrating a method for determining a depth and resolution of a 3D object according to an embodiment of the present disclosure.

FIG. 20 is a flowchart illustrating a method for determining a depth and resolution of a 3D object according to an embodiment.

In step S210, experimental measurement values of N persons are obtained by adjusting parameters for a 3D pattern, in which N is an integer greater than or equal to 1.

In step S220, a pre-calculated ideal measurement value as a correct answer is compared with the experimental measurement values of N persons. In an embodiment, the pre-calculated ideal measurement value may be a result obtained by simulating a depth for a change of a parameter with respect to a pre-stored 3D pattern. Alternatively, the pre-calculated ideal measurement value may be an average of experimental measurement values of a plurality of persons.

In step S230, an actual measurement value is obtained when the experimental measurement value is a preset correct answer rate or more. In an embodiment, the preset correct answer rate may be about 90% or more. However, embodiments of the present disclosure are not necessarily limited thereto.

In step S240, depth and resolution corresponding to the actual measurement value obtained for the adjusted parameter are determined.

To increase reliability of the experiment, the same experiment may be repeated m times for the same user and an average thereof may be used as the experimental measurement value in which m is an integer greater than 1. In addition, to increase reliability of the experiment, the experiment may be repeated m times for n different users and an average thereof may be used as the experimental measurement value.

Figure 21:
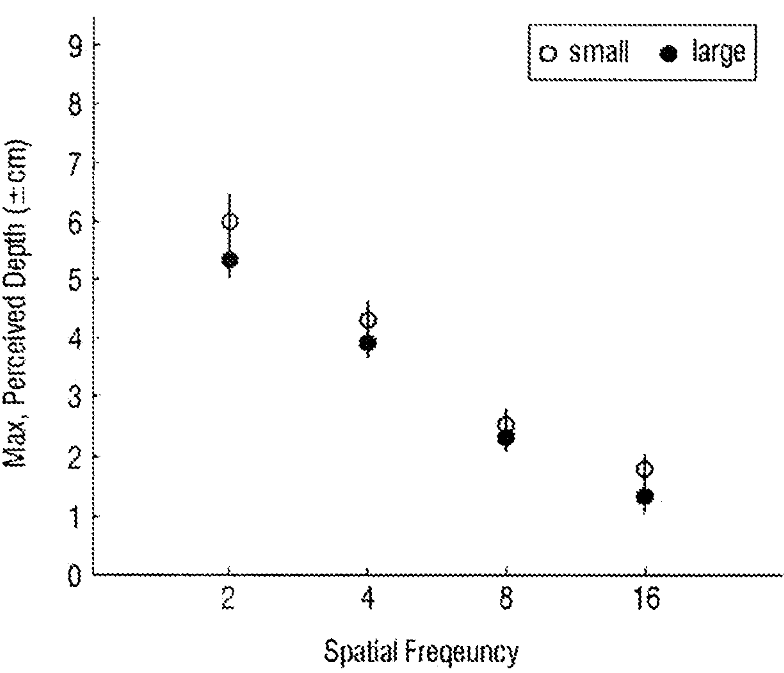
FIGS. 21 and 22 are graphs illustrating a range of perceptible depth according to a change in size and spatial frequency according to embodiments of the present disclosure.
Figure 22:
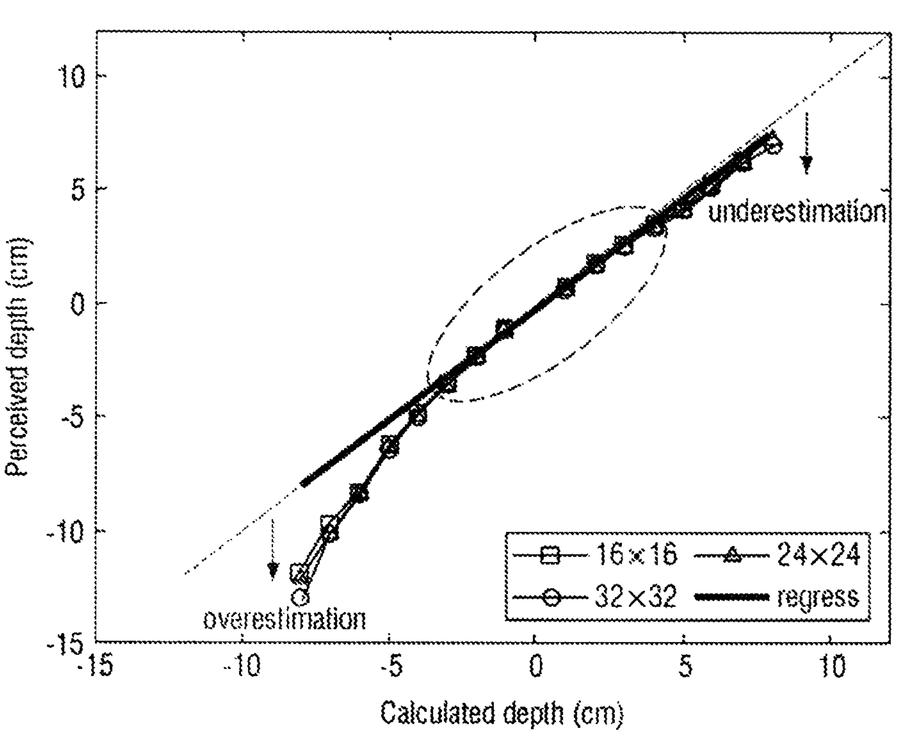

FIGS. 21 and 22 are graphs illustrating a range of perceptible depth according to a change in size and spatial frequency.

Referring to FIG. 21, a horizontal axis represents a spatial frequency, and a vertical axis represents a perceptible depth.

A white circle indicates an embodiment in which the size of the random dot is relatively small, and a black circle indicates an embodiment in which the size of the random dot is relatively large.

Referring to FIG. 21, the maximum perceptible depth according to the size of the random dot for each spatial frequency is illustrated. It may be seen that the higher the spatial frequency, the lower the maximum perceptible depth. In addition, it may be seen that an embodiment in which the size of the random dot to which the same spatial frequency is set is relatively small has a higher maximum perceptible depth than an embodiment in which the size of the random dot is relatively large.

FIG. 22 is a graph illustrating a calculated ideal measurement value of depth of the 3D object and an actually measured perceive depth.

Referring to FIG. 22, it is illustrated that perception distortion decreases as a distance from a thick solid line, which is the ideal measurement value, decreases, and shape perception distortion increases as the distance from the thick solid line, which is the ideal measurement value, increases. It may be seen that the consistency of the depth of about −4 cm to about 5 cm with the thick solid line is greater than that of other depths. It may be seen that the distance from the thick solid line increases in a depth of about −5 cm or less.

Figure 23:
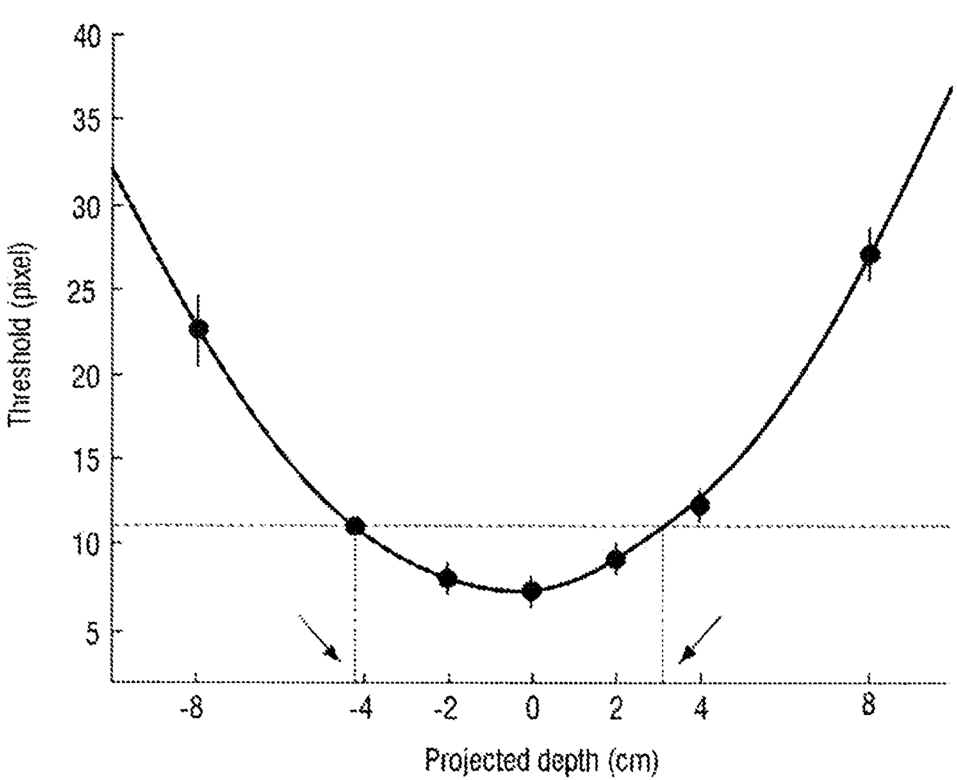
FIG. 23 is a graph illustrating the number of letter discrimination pixels according to a depth according to an embodiment of the present disclosure.

FIG. 23 is a graph illustrating the number of letter discrimination pixels according to a depth.

In FIG. 23, a horizontal axis represents a depth, and a vertical axis represents the number of discrimination pixels.

Referring to FIG. 23, it is possible to calculate a range value of the maximum depth in which an "F" stimulus may be clearly perceived. For example, when the depth is about −4.2 cm, a threshold value of the number of perceptible pixels is 11 pixels. In addition, when the depth is about 3.2 cm, the threshold value of the number of perceptible pixels is 11 pixels.

However, the aspects of embodiments of the present disclosure are Pot restricted to the one set forth herein.

What is claimed is:

1. An apparatus for measuring a depth of a three-dimensional (3D) object, the apparatus comprising:
- a control unit generating the 3D object by adjusting parameters of a 3D pattern;
- a 3D display unit displaying the 3D object with a preset depth;
- an input unit generating an input signal based on an input received from a user;
- a rail extending in a front and a rear of the 3D display unit;
- a moving body that is movable on the rail, wherein movement of the moving body is adjusted based on the input signal; and
- a distance sensor measuring a distance to the moving body,
- wherein the parameters are a size of the 3D object and/or a spatial frequency of the 3D object.

2. The apparatus of claim 1, wherein the 3D pattern comprises a random dot, a pseudorandom dot or a letter.

3. The apparatus of claim 1, wherein the moving body moves forward along the rail in a direction that image display light of the 3D display unit that forms the 3D object is emitted or moves backward along the rail in a direction opposite to the direction that the image display light is emitted in response to the input signal.

4. The apparatus of claim 3, wherein the movement of the moving body stops in response to the input signal.

5. The apparatus of claim 4, wherein the moving body includes:
- a traveling body;
- at least one pair of wheels disposed on the rail;
- a driving unit connected to the at least one pair of wheels and providing a rotational driving force to the at least one pair of wheels for moving the moving body;
- a support portion extending in a first direction of the traveling body; and
- an indicator extending from the support portion in a second direction.

6. The apparatus of claim 5, wherein the indicator is disposed on a straight line with a position corresponding to a depth of the 3D object perceived by the user based on the input signal.

7. The apparatus of claim 1, wherein the distance sensor is disposed at a first end of the rail.

8. The apparatus of claim 1, wherein the distance sensor is an infrared distance sensor, an ultrasonic sensor or a laser distance sensor.

9. The apparatus of claim 4, wherein the distance sensor measures the distance when the moving body stops movement.

10. The apparatus of claim 1, further comprising a jig portion fixing a position of the user, the jig portion is disposed on a straight line with a first end of the rail.

11. The apparatus of claim 1, wherein the 3D display unit includes:
- a display panel including a plurality of pixels; and
- an optical layer disposed in a light output direction of the display panel.

12. The apparatus of claim 11, wherein the optical layer is a plurality of lenses or a parallax barrier.

13. An apparatus for measuring a depth of a three-dimensional (3D) object the apparatus comprising:
- a control unit generating the 3D object by adjusting parameters of a 3D pattern;
- a 3D display unit displaying the 3D object with a preset depth;
- an input unit generating an input signal based on an input received from a user;
- a rail extending in a front and a rear of the 3D display unit;
- a moving body that is movable on the rail, wherein movement of the moving body is adjusted based on the input signal; and
- a distance sensor measuring a distance to the moving body,
- wherein the moving body is positioned at a position corresponding to a depth of the 3D object perceived by the user based on the input signal,
- wherein the parameters are a size of the 3D object and/or a spatial frequency of the 3D object.

14. The apparatus of claim 13, wherein the moving body moves forward along the rail in a direction that image display light of the 3D display unit that forms the 3D object is emitted or moves backward along the rail in a direction opposite to direction that the image display light is emitted in response to the input signal.

15. A method for measuring a depth of a three-dimensional (3D) object, the method comprising:
- generating the 3D object by adjusting parameters of a 3D pattern by a control unit;
- displaying the generated 3D object by a display unit;

moving a moving body from a first end of a rail towards the display unit;

generating an input signal based on an input received from a user by an input unit;

stopping movement of the moving body based on the input signal; and measuring a distance from a distance sensor to the moving body when the movement of the moving body is stopped by a distance measuring unit.

16. The method of claim 15, wherein the parameters are a size of the 3D object and/or a spatial frequency of the 3D object.

17. The method of claim 15, wherein the 3D pattern comprises a random dot, a pseudorandom dot or a letter.

18. The method of claim 15, further comprising processing the parameters as a depth measurement error when the input signal is not generated for a preset time after the 3D object is displayed by the control unit.

* * * * *